United States Patent [19]

Singh et al.

[11] Patent Number: 5,260,248
[45] Date of Patent: Nov. 9, 1993

[54] STABLE HIGH TEMPERATURE MANGANESE BASED OXIDATION CATALYST

[75] Inventors: Nirmal Singh; Kenneth S. Pisarczyk, both of Peru, Ill.

[73] Assignee: Carus Corporation, Peru, Ill.

[21] Appl. No.: 937,989

[22] Filed: Aug. 28, 1992

[51] Int. Cl.$^5$ .................. B01J 23/10; B01J 23/34; B01J 23/72; B01J 21/04
[52] U.S. Cl. .................................. 502/303
[58] Field of Search ....................... 502/303, 241

[56] References Cited

U.S. PATENT DOCUMENTS

| | | | |
|---|---|---|---|
| 3,681,011 | 8/1972 | Gazza et al. | 423/263 |
| 3,796,793 | 3/1974 | Metzer et al. | 423/263 |
| 3,865,923 | 2/1975 | Stephens | 423/213.2 |
| 3,901,828 | 8/1975 | Mai et al. | 502/303 |
| 3,914,389 | 10/1975 | Haacke | 502/303 X |
| 3,914,389 | 10/1975 | Haacke | 502/303 X |
| 3,925,001 | 12/1975 | Salooja | 502/324 X |
| 3,929,670 | 12/1975 | Kudo et al. | 502/303 X |
| 3,957,690 | 5/1976 | Bobolev et al. | 502/303 |
| 3,978,004 | 8/1976 | Daumas et al. | 502/303 |
| 4,003,851 | 1/1977 | Ebel et al. | 502/320 |
| 4,061,594 | 12/1977 | Michel et al. | 502/303 |
| 4,077,912 | 3/1978 | Dolhyj et al. | 502/324 X |
| 4,164,544 | 8/1979 | Olsson et al. | 423/230 |
| 4,180,549 | 12/1979 | Olsson et al. | 423/230 |
| 4,209,424 | 6/1980 | Le Goff et al. | 502/331 X |
| 4,230,603 | 10/1980 | Olsson et al. | 502/524 |
| 4,289,919 | 9/1981 | Myers | 585/664 |
| 4,290,923 | 9/1981 | Mein et al. | 502/303 |
| 4,299,735 | 11/1981 | Mein et al. | 502/317 X |
| 4,323,482 | 4/1982 | Stiles et al. | 502/303 |
| 4,542,245 | 9/1985 | Lecloux et al. | 568/842 |
| 4,585,899 | 4/1986 | Gelbein et al. | 568/435 |
| 4,722,920 | 2/1988 | Kimura et al. | 502/439 |
| 4,968,661 | 11/1990 | Teller et al. | 502/304 |

OTHER PUBLICATIONS

Azuma et al., Chemical Abstracts 81:175617f (1974).
Dima et al., Chemical Abstracts 89:79578p (1978).
Kiyogane et al., Chemical Abstracts 85:51193c (1976).
Shiramoto, Chemical Abstracts 83:120333w (1975).
Suzaki et al., Chemical Abstracts 84:79170w (1976).
Suzuki et al., Chemical Abstracts 86:176549a (1977).
Fukuda et al., Chemical Abstracts 113:106954h (1990).
Gallagher et al., *Preparation, Structure, and Selected Catalytic Properties of the System* $LaMn_{1-x}Cu_xO_{3-y}$. 60 J. Am. Ceramic Soc., 28-31 (1977).
Gallagher et al., Chemical Abstracts 81:176972e (1974).
Johnson et al., Chemical Abstracts 87:91278g (1977).
Johnson et al., Chemical Abstracts 84:185403j (1976).
Johnson et al., Chemical Abstracts 80:52668v (1974).
Kodama, Chemical Abstracts 99:127765c (1983).
Komarov et al., Chemical Abstracts 111:84796k (1989).
Nakamura et al., Chemical Abstracts 94:83541s (1981).
Ogura et al., Chemical Abstracts 113:137788j (1990).
Tabata, Chemical Abstracts 104:21820y (1986).
Tascon et al., Chemical Abstracts 94:149365w (1981).
Varlomov et al., Chemical Abstracts 109:135890e (1988).
Voorhoeve et al., *Rare-Earth Oxides of Manganese and Cobalt Rival Platinum for the Treatment of Carbon Monoxide in Auto Exhaust*, 177, Science, 353-354 (1972).
Voorhoeve et al., Chemical Abstracts 85:25793d (1976).
Wang et al., Chemical Abstracts 92:83199v (1980).
Wang et al., Chemical Abstracts 99:59497q (1983).
Yao, Chemical Abstracts 82:116639n (1975).

*Primary Examiner*—W. J. Shine
*Assistant Examiner*—Douglas J. McGinty
*Attorney, Agent, or Firm*—Fitch, Even, Tabin & Flannery

[57] ABSTRACT

This invention relates to a manganese oxide catalyst composition consisting essentially of at least about 40 weight percent manganese, from about 1 to about 25 weight percent lanthanum, from about 5 to about 20 weight percent copper and from about 20 to about 30 weight percent oxygen, a high temperature stable manganese catalyst/carrier combustion oxidation catalyst composition and a method of destroying VOCs and other gaseous organics using the composition of the invention.

12 Claims, No Drawings

STABLE HIGH TEMPERATURE MANGANESE BASED OXIDATION CATALYST

This invention is directed to a high temperature stable oxidation catalyst for the destruction of gaseous volatile organic emissions including, but not limited to some that are defined by the United States Environmental Protection Agency (EPA) as "photochemically active" volatile organic compounds ("VOCs"). More particularly this invention is directed to a manganese oxide combustion oxidation catalyst consisting essentially of at least about 40 weight percent maganese, with lanthanum, copper and oxygen being lesser constituents, a manganese oxide catalyst/carrier composition where the manganese oxide catalyst is impregnated into a carrier and a method of destruction of volatile organic emissions using the manganese oxide combustion oxidation catalyst of the invention.

BACKGROUND OF THE INVENTION

Various hopcalite and perovskite catalysts are known and used for the destruction of volatile organic emissions in the gaseous form.

Hopcalite Catalysts

The term hopcalite refers to a family of oxidation catalysts consisting of manganese dioxide ($MnO_2$) in mixture with one or more oxides of other transition metals such as copper, cobalt and silver.

Hopcalite oxidation catalysts are not generally used in applications having temperatures higher than about 540° C. Above such a temperature level the catalyst is deactivated. These catalysts are well suited oxidation catalysts, however, at temperatures of not greater than 540° C.

Hopcalite-type oxidation catalysts can be made by just mixing and ball milling the component oxides, i.e. $MnO_2$, $CuO$, $Ag_2O$, $Co_2O_3$. There is no calcination at higher temperatures (>100° C.) involved.

In an alternative approach (U.S. Pat. Nos. 4,290,923 and 4,299,735), an alkali metal manganate dioxide hydrate ($K_2O \cdot 4MnO_2 \cdot xH_2$—which occurs as a coproduct in the oxidation of organics with $KMnO_4$) is treated with aqueous solutions of selected heavy metal salts (i.e. Cu, Ag, Co, Cr, Fe, Pb, Ce and La). The purpose of this treatment is to effect the exchange of alkali metal ion on the $MnO_2$ against the heavy metal ions. The resulting heavy metal $MnO_2$s, representing hopcalite-type catalysts, can be pelletized—preferably with the incorporation of a carrier material such as bentonite or activated alumina.

Perovskite Catalysts

Perovskite type catalysts are distinguished by their particular crystal structure, which is named after the titanium mineral perovskite (calcium titanate).

An oxidation catalyst of this type may be composed of elements such as lanthanum, manganese, copper, and oxygen, as, for example, represented by the formula $LaMn_{0.5}Cu_{0.5}O_3$. That type of catalyst has been found usable for oxidations at operating temperatures substantially exceeding those tolerated by hopcalites, namely up to about 650° C.

The main difference in the preparation of a perovskite catalyst (compared to a hopcalite catalyst) is the inclusion of a high temperature (700° C.) calcination step. This high temperature, in conjunction with specific compositions, is necessary to form the unique crystalline structure referred to as a perovskite structure. Formation of this structure is also contingent upon the presence of the components in the proper proportion; for a La/Mn/Cu catalyst, the composition of the mixture (before calcination) must allow the formation of a compound of the general formula:

$$LaMn_{1-x}Cu_xO_3; \quad x = 0.3-0.5$$

A typical perovskite oxidation catalyst is $LaMn_{0.5}Cu_{0.5}O_3$ (see Haake, U.S. Pat. No. 3,914,389).

The preparation of the above perovskite catalyst involves first the freeze drying of a solution containing La, Cu, and Mn (as nitrates) in the desired proportions. The dried intermediate is then heat-treated at 250° C. to effect the thermal conversion of the nitrates into the oxides and finally the oxide mixture is calcined for 72 hours at 650° C. in oxygen. After calcination, the material is crystallized in a perovskite phase, according to X-ray analysis.

Perovskite catalysts are described in U.S. Pat. No. 3,865,923 to Stephens, U.S. Pat. No. 3,914,389 to Haacke and U.S. Pat. No. 3,901,828 to Mai, et al. Haack describes "oxidation catalysts" and Mai, et al. as well as Stephens both describe these catalysts for the destruction of exhaust gases. It is significant, however, these catalysts have lanthanum as a major constituent such as from about 42 to about 56 weight percent and manganese content such as between about 11 to about 25 weight percent.

OBJECTS OF THE INVENTION

High temperature tolerance is a very important feature in oxidation catalysts used for the purification of air streams. This because of two main reasons:

a) the exothermic nature of catalytic combustion, and
b) the fluctuation in the organic impurity content in industrial off-gas streams.

As applies to the greater majority of oxidations, combustion generates heat; and this heat which usually does not rapidly dissipate, will have a strong influence on the temperature of the catalyst bed.

It follows that the catalyst bed temperature is to a large degree affected by the organic loading of the airstream. If that loading were uniform at all times, it would be a relatively easy matter to control the temperature, but this is rarely the case with industrial catalytic reactors.

A sudden surge in impurity concentration will cause the temperature to rise and if this rise substantially exceeds the temperature tolerance of the catalyst, it can mean the loss of part or all of its catalytic activity plus a decrease in the mechanical strength of the catalyst pellets.

The problem is particularly prevalent with hopcalite-type catalysts, where even a short-term rise to temperatures of about 540° C. and above can cause the $MnO_2$ in the catalyst to thermally deoxidize to a lower manganese oxide:

$$2MnO_2 \rightarrow Mn_2O_3 + \tfrac{1}{2}O_2.$$

An alternate deactivation mechanism is the chemical reduction of the $MnO_2$ in the catalyst by the substrate. In each of the two cases, the loss of catalytic activity is permanent.

Experience has shown that the average operating temperature for hopcalite-type catalysts should not be much higher than about 250° to about 290° C. to allow for anticipated surges in temperature. Perovskite type catalysts, however, are operated at about 370° C. to about 400° C. and can take short-term temperature surges to as high as about 700° C. without loss of activity. Thus the advantage of higher temperature tolerance is obvious. Additionally, higher operating temperatures will allow higher organic loadings and therefore better economics. Since the perovskite catalyst is not very vulnerable by high temperature excursions, its average useful life should exceed that of a comparable hopcalite catalyst.

From an economic point of view, it is significant that lanthanum based perovskite catalysts are expensive by virtue of the raw material cost of lanthanum. Less expensive hopcalites are not able to withstand high temperatures and have low halogen and $SO_2$ resistance. The catalyst of the invention combines the raw material cost advantage of the hopcalites, with the high temperature tolerance and halogen poisoning resistance of the perovskites.

It is an object of the present invention to provide a new manganese based combustion oxidation catalyst.

It is another object of the present invention to provide a manganese based combustion oxidation catalyst impregnated into a carrier having a high surface area to provide a temperature stable manganese catalyst combined with a carrier.

It is another object of the invention to provide a combustion oxidation catalyst which is only slightly reduced in efficiency by the presence of chlorine or other halogens.

It is yet another object of the invention to provide a method for the destruction of VOCs and other organic pollutants in a gaseous form.

These and other objectives of the invention will be more fully described and become apparent by reference to the following description of the invention.

SUMMARY OF THE INVENTION

According to the invention, the catalyst composition, which is a combustion oxidation catalyst, is a manganese oxide catalyst consisting essentially of at least about 40 weight percent manganese, preferably from about 40 to about 60 weight percent manganese, from about 1 to about 25 weight percent and preferably from about 8 to about 12 weight percent lanthanum, from about 5 to about 20 weight percent and preferably from about 12 to about 16 weight percent copper and from about 20 to about 30 weight percent and preferably from about 23 to about 29 weight percent oxygen. In an important aspect of the invention, the catalyst composition has about 49 weight percent manganese, about 10 weight percent lanthanum, about 14 weight percent copper, and about 27 weight percent oxygen; and in this aspect is represented by the general formula $La_{0.3}CuMn_4O_x$ wherein $X=7$ to 8.

In another important aspect the catalyst composition is impregnated into high surface area carrier to provide a high temperature stable manganese oxide combustion oxidation catalyst/carrier combination. In this aspect of the invention, the manganese catalyst/carrier composition comprises from about 10 to about 40 weight percent and preferably from about 20 to about 25 weight percent catalyst composition and from about 90 to about 60 weight percent and preferably from about 80 to about 75 weight percent carrier, based upon the weight of the catalyst/carrier composition.

In a particularly important aspect of the invention, the catalyst composition is impregnated into alumina spheres having a diameter in the range of from about 0.08 mm to about 13 mm and a surface area in the range of from about 50 to about 300 $m^2/g$.

The manganese oxide catalyst composition and manganese oxide combustion oxidation catalyst/carrier composition provide improved oxidation efficiencies for VOCs and other organic air pollutants, are stable at operating temperatures up to about 700° C. and may be used to destroy and oxidize VOCs and other organic air pollutants between about 370° C. to about 650° C., and does not lose more than about 0.10% its oxidation efficiency even when intermittently exposed to an airstream containing 900 ppm of a chlorine containing organic at about 480° C. Hence, an important aspect of the invention is a method to destroy and/or oxidize VOCs and other organic air pollutants by exposing the VOCs to the manganese oxide catalyst of the manganese oxide combustion catalyst/carrier composition at a temperature range of from about 370° to about 700° C.

DESCRIPTION OF THE PREFERRED EMBODIMENTS

"VOC" means volatile organic compounds. "Volatile organic compounds" are defined by the U.S. Environmental Protection Agency as any organic compound which participates in atmospheric photochemical reactions, except for specific designated compounds which have negligible photochemical activity. The catalyst composition is suitable for the oxidative destruction of a wide range of volatile organic compounds (VOCs) including but not limited to benzene, toluene, xylene, styrene, pentane, 2-propanol, ethyl acetate and 2-butanone. Further, it oxidizes numerous non-VOC compounds, such as carbon monoxide, ethanol, propanol, propylacetate and butylacetate.

The term "oxidation catalyst" means a substance or product designed to affect the rate of an oxidation reaction by either accelerating it or slowing it down. A particular kind of oxidation catalyst is "combustion oxidation catalyst" whereby the chemical reaction occurs between the oxidizable substrate (organic or inorganic) and gaseous (atmospheric) oxygen.

A combustion oxidation catalyst will usually enhance the oxidation process in the direction that allows the combustion to occur at a lower temperature than is needed without the catalyst. Its presence can also achieve a more complete combustion, i.e. a greater conversion of the organic combustibles to $CO_2$ and $H_2O$ thereby reducing the percentage of partially oxidized compounds (such as CO or formic acid, etc.) in the combustion gases.

"Carrier" means the support for the catalyst composition. Useful supports include alumina, silica, silica-alumina, magnesia, silica-magnesia-alumina and zirconia. The supports may be in the form of spheres, pellets, extrusions or structures such as a honeycomb-like structure or other types of monoliths. The carrier should have a "high surface area" such as in the range of from about 50 to about 300 square meters per gram of carrier.

With respect to the manganese oxide combustion oxidation catalyst composition and its stability to heat, "high temperature stable" means the capability of the catalyst to withstand at least about 480° C. for at least about 8,000 hours without losing more than about 0.5% of its activity. In the alternative, stability also means exposure of the catalyst to about 760° C. for about 70 hrs. which exposure results in no measurable loss of activity of the catalyst. In this connection, a loss of catalytic activity can be brought about by exposure of an oxidation catalyst to temperatures at which the $MnO_2$ in the catalyst spontaneously deoxidizes: $2 MnO_2 \rightarrow Mn_2O_3 + \frac{1}{2}O_2$. The above reaction will occur with hopcalite type catalysts at about 540° C. whereas with perovskite type materials temperatures up to 700° C. might be tolerated.

Also at elevated temperatures, deactivation of the catalyst might not only be limited to thermal degradation, but can also be caused by chemical reduction of the $MnO_2$ in the catalyst with the pollutant acting as the reducing agent. This reduction is usually irreversible and will lead to permanent poisoning.

It is quite likely that in cases of overheating the catalyst, both thermal and chemical deactivations can occur simultaneously.

An additional mode of oxidation catalyst poisoning is usually caused by the presence of halogen and/or sulfur-containing organic pollutants, such as, for example by $CH_2Cl_2$ or by $CH_3SH$. As the carbon skeleton becomes oxidized to $CO_2$ the organically bound chlorine or bromine is converted into HCl and HBr respectively. For example:

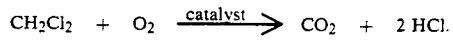
$$CH_2Cl_2 + O_2 \xrightarrow{\text{catalyst}} CO_2 + 2 HCl.$$

The HCl thus formed can interact with the $MnO_2$ of the catalyst, converting it into manganese chloride or manganese oxychloride, thereby causing its deactivation. As previously described the catalyst of the invention is resistant to poisoning by chlorine.

There is a somewhat similar reaction sequence involved in the catalytic oxidation of organic sulfur compounds, when the valence of the sulfur is +4 or less. The sulfur is transformed into $SO_2$, which reacts with the $MnO_2$ of the catalyst to firm form manganese sulfite and then (by further oxidation) to manganese sulfate. Here again, the end result is the loss of catalytic activity.

The manganese oxide combustion oxidation catalyst composition of the invention consists essentially of at least about 40 weight percent manganese, from about 1 to about 25 weight percent lanthanum, from about 12 to about 16 weight percent copper and from about 20 to about 30 weight percent oxygen. Preferably the manganese oxide combustion oxidation catalyst composition consists essentially of from about 40 to about 60 weight percent manganese, from about 8 to about 12 weight percent lanthanum, from about 12 to about 16 weight percent copper and from about 23 to about 29 weight percent oxygen. In its broad form the manganese oxide catalyst composition of the invention, which is stable up to about 700° C. and may be used to oxidize organic compounds between about 370° C. and 650° C., may be represented by the general formula:

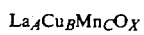
$$La_A Cu_B Mn_C O_X$$

wherein
A=0.03-0.9;
B=0.33-1.5;
C=2.00-5.5; and X=5-9.

In an important aspect of the invention, the catalyst composition has about 49 weight percent manganese, about 10 weight percent lanthanum, about 14 weight percent copper and about 27 weight percent oxygen.

The manganese oxide catalyst/carrier composition is another important aspect of the invention. In this aspect, the manganese oxide catalyst is impregnated into a carrier to provide a high temperature stable combustion oxidation catalyst which comprises a manganese oxide catalyst/carrier combination at least about 10 weight percent manganese oxide catalyst. In this aspect the catalyst/carrier composition comprises from about 10 to about 40 weight percent catalyst and preferably from about 20 to about 25 weight percent catalyst, and from about 90 to about 60 weight percent and preferably from about 80 to about 75 weight percent carrier. A high surface area carrier is a particularly important aspect of the catalyst/carrier composition. Further, alumina particles having shapes approximating spheres having a diameter in the range of from about 0.08 mm to about 13 mm impregnated with the catalyst composition of the invention is a particularly important aspect of the catalyst/carrier composition.

The preparation of the manganese oxide catalyst composition starts with an aqueous solution of the component nitrate salts. Cupric nitrate, lanthanum nitrate and manganese nitrate are mixed together as aqueous solutions in concentrations effective for providing the ratios of manganese, lanthanum and copper in the manganese oxide catalyst composition. For a 36 weight percent solution of the salt mixture, the ratio will be about 5:7:24 cupric nitrate, lanthanum nitrate and manganese nitrate, respectively. The mixture of nitrate solutions is evaporated to dryness, preferably under vacuum. Thereafter, the dried residue is heated to about 400° C. to about 700° C. for about 6 to 10 hours to effect the thermal conversion of the intermediate composition to the manganese oxide catalyst composition.

The catalyst/carrier composition is made by impregnating the carrier with the mixture of nitrate solutions described above. This may be done by putting the carrier into the mixture of solutions and keeping the latter combination under a vacuum of about 254 to about 380 mm Hg at a temperature in the range of from about 15° C. to about 25° C. for about 2 to about 4 hours. Thereafter the excess solution is drained from the carrier, dried such as at about 90° to 100° C., and calcined at from about 400° to about 700° C. for about 6 to about 10 hours.

In a simplified alternative method, (described in Example II), the impregnation of the alumina pellets with the nitrate salts solution is achieved by soaking at or above atmospheric pressure. In this case, the volume of the salts solution is adjusted in such a way that there is no excess solution to be drained at the end of the soaking step.

The following methods are set for how to make the composition of the invention and practice the method of the invention.

EXAMPLE I

The Catalyst/Carrier Composition 82.53 g. of $Cu(NO_3)_2 2.5 H_2O$ is dissolved in 400 cc of distilled water. To the cupric nitrate solution is then added 190 grams of 65% $La(NO_3)_3 \cdot 6H_2O$ solution, and 608 grams of 50% $Mn(NO_3)_2$ solution. 250 grams of high surface area activated alumina spheres are impregnated with the solution under a vacuum for two hours. The excess solution is drained and the catalyst dried at 93° C. and calcined at 400° C. for two hours, and then at 700° C. for eight hours. The process is repeated to obtain the catalyst loading of 20-25%.

EXAMPLE II

The Catalyst/Carrier Composition 250 g of activated alumina pellets are soaked for about two hours in a solution prepared by dissolving
37.52 g $Cu(NO_3)_2 \times 2.5\ H_2O$,
36.50 g of a 63.2% aqueous solution of $La(NO_3)_3 \times 6\text{-}H_2O$ and
229.0 g of a 50% aqueous solution of $Mn(NO_3)_2$ in 250 cc of distilled water.

Subsequently, the soaked alumina pellets are first heated under vacuum to about 90° C. until dry and then calcinated at 700° C. for 8 hours. If desired, the soaking/drying/calcination procedure can be repeated to increase the catalyst loading of the pellets.

EXAMPLE III

The catalyst of Example I comprising 25 weight percent manganese oxide catalyst was tested for its efficiency in oxidizing various organic substrates by contacting it with pollutant-containing air under controlled conditions and measuring the pollutant concentrations before and after the contact with the catalyst bed. The key testing parameters as well as the results of each test (expressed as % efficiency) are listed in Table I below.

The testing apparatus and the procedure used can be described as follows:

The catalyst test reactor is 45 mm in diameter and 146 mm in height. The activity test involved passing an air stream containing a known amount of hydrocarbons through the catalyst bed. Approximately three inches of quartz glass beads were placed above 125 cc of catalyst to provide a uniform gas flow. The catalyst bed was heated with clean air until the catalyst mid temperature reached approximately 370° C. The hydrocarbons were then introduced into the air stream. The hydrocarbon oxidation efficiency of catalyst was measured as the percent reduction of the inlet hydrocarbon concentration at various catalyst mid-bed temperatures.

The hydrocarbon concentration was determined with a hydrocarbon analyzer which utilizes flame ionization as the principle of detection.

TABLE I

| CATALYST TYPE | PARTICLE MESH SIZE[1] | SUBSTRATE | GHSV* $HR^{-1}$ | LINEAR FT/SEC | VELOCITY cms/sec | CONC. IN AIR PPM | OPERATING TEMP. °F. | OPERATING TEMP. °C. | DESTRUCTION EFFICIENCY, % |
|---|---|---|---|---|---|---|---|---|---|
| $La_{0.33}CuMn_4O_x$ $x = 7-8$ | 3 × 6 | 2-Butanone | 10,000 | 1.1 | 33.53 | 1125 | 650 | 343 | 99.98 |
| | | | 15,000 | 1.1 | 33.53 | 1125 | 750 | 399 | 99.97 |
| | | | 20,000 | 1.1 | 33.53 | 1125 | 800 | 427 | 99.91 |
| | | | 20,000 | 2.2 | 67.06 | 1125 | 600 | 316 | 99.93 |
| | | | 25,000 | 2.2 | 67.06 | 1125 | 750 | 399 | 99.93 |
| | | | 30,000 | 2.2 | 67.06 | 1125 | 900 | 482 | 99.95 |
| | 6 × 8 | 2-Butanone | 15,000 | 1.1 | 33.53 | 1125 | 650 | 343 | 99.96 |
| | 3 × 6 | Ethyl Acetate | 15,000 | 1.1 | 33.53 | 1380 | 900 | 482 | 99.91 |
| | | | 20,000 | 2.2 | 67.06 | 1380 | 750 | 399 | 99.91 |
| | | | 25,000 | 2.2 | 67.06 | 1380 | 850 | 454 | 99.93 |
| | 3 × 6 | Propyl Acetate | 15,000 | 1.1 | 33.53 | 1200 | 1000 | 538 | 99.72 |
| | | | 20,000 | 2.2 | 67.06 | 1200 | 750 | 399 | 99.80 |
| | | | 25,000 | 2.2 | 67.06 | 1200 | 900 | 482 | 99.91 |
| | | | 30,000 | 2.2 | 67.06 | 1200 | 1000 | 538 | 99.74 |
| | 3 × 6 | Ethanol | 15,000 | 1.1 | 33.53 | 3500 | 900 | 482 | 99.90 |
| | | | 20,000 | 2.2 | 67.06 | 3500 | 750 | 399 | 100.00 |
| | | | 25,000 | 2.2 | 67.06 | 3500 | 850 | 454 | 99.93 |
| | | | 30,000 | 2.2 | 67.06 | 3500 | 900 | 482 | 99.75 |
| | 3 × 6 | 1-Propanol | 15,000 | 1.1 | 33.53 | 1800 | 800 | 427 | 99.90 |
| | | | 20,000 | 2.2 | 67.06 | 1800 | 700 | 371 | 99.90 |
| | | | 25,000 | 2.2 | 67.06 | 1800 | 850 | 454 | 99.90 |
| | | | 30,000 | 2.2 | 67.06 | 1800 | 950 | 510 | 99.74 |
| | 3 × 6 | Butyl Acetate | 15,000 | 1.1 | 33.53 | 1125 | 850 | 454 | 99.93 |
| | 3 × 6 | Acetone | 15,000 | 1.1 | 33.53 | 1500 | 750 | 399 | 99.96 |
| | 3 × 6 | Toluene | 15,000 | 1.1 | 33.53 | 820 | 1000 | 538 | 99.53 |
| | 3 × 6 | Heptane | 15,000 | 1.1 | 33.53 | 1200 | 1000 | 538 | 98.88 |
| | | | 15,000 | 1.67 | 50.90 | 1200 | 1000 | 538 | 99.55 |
| | 3 × 6 | Benzene | 15,000 | 1.1 | 33.53 | 600 | 1000 | 538 | 96.44 |
| | 3 × 6 | Xylene | 15,000 | 1.1 | 33.53 | 820 | 1000 | 538 | 99.74 |
| | 3 × 6 | Styrene | 15,000 | 1.1 | 33.53 | 1050 | 1000 | 538 | 99.64 |
| | 3 × 6 | Pentane | 15,000 | 1.1 | 33.53 | 1380 | 1000 | 538 | 98.37 |
| | 3 × 6 | Carbon Monoxide | 15,000 | 1.1 | 33.53 | 2400 | 900 | 482 | 98.33 |

[1] U.S. standard sieve size.
*GHSV stands for Gas Hourly Space Velocity.

Although the invention has been described with regard to its preferred embodiments, it should be understood that various changes and modifications as would be obvious to one having the ordinary skill in this art may be made without departing from the scope of the invention which is set forth in the claims appended hereto.

The various features of this invention which are believed new are set forth in the following claims.

What is claimed is:

1. A manganese oxide catalyst composition consisting essentially of at least about 40 weight percent manganese, from about 1 to about 25 weight percent lanthanum, from about 5 to about 20 weight percent copper and from about 20 to about 30 weight percent oxygen, wherein the catalyst is high temperature stable.

2. A manganese oxide catalyst composition as recited in claim 1 wherein the composition has from about 40 to about 60 weight percent manganese.

3. A manganese oxide catalyst composition as recited in claim 1 wherein the composition consists essentially of from about 40 to about 60 weight percent manganese, from about 8 to about 12 weight percent lanthanum, from about 12 to about 16 Weight percent copper and from about 23 to about 29 weight percent oxygen.

4. A manganese oxide catalyst composition as recited in claim 1 wherein the composition consists essentially of about 49 weight percent manganese, about 10 weight percent lanthanum, about 14 weight percent copper and about 27 weight percent oxygen.

5. A manganese oxide catalyst composition as recited in claim 1 and wherein the composition has the formula $La_{0.33}CuMn_4O_X$ wherein $X = 7$ to $8$.

6. A high temperature stable manganese catalyst/carrier combustion oxidation catalyst composition comprising:
at least about 10 weight percent of a manganese oxide catalyst composition; and
a carrier composition impregnated with the manganese oxide catalyst composition,
the manganese oxide catalyst composition consisting essentially of at least about 40 weight percent manganese, from about 1 to about 25 weight percent lanthanum, from about 5 to about 20 weight percent copper and from about 20 to about 30 weight percent oxygen.

7. A manganese catalyst/carrier composition as recited in claim 6 wherein the manganese oxide catalyst composition consists essentially of from about 40 to about 60 weight percent manganese, from about 8 to about 12 weight percent lanthanum, from about 12 to about 16 weight percent copper and from about 23 to about 29 weight percent oxygen.

8. A manganese catalyst/carrier composition as recited in claim 6 wherein the catalyst/carrier composition comprises from about 10 to about 40 weight percent of the manganese oxide catalyst composition.

9. A manganese catalyst/carrier composition as recited in claim 7 wherein the catalyst/carrier composition comprises from about 20 to about 25 weight percent manganese oxide catalyst.

10. A manganese alumina combustion oxidation catalyst comprising:
from about 10 to about 40 weight percent of a manganese oxide catalyst composition; and
alumina spheres impregnated with the manganese oxide catalyst, the alumina spheres having a diameter of at least about 0.08 mm,
the manganese oxide catalyst composition consisting essentially of at least about 40 weight percent manganese, from about 1 to about 25 weight percent lanthanum, from about 5 to about 20 weight percent copper and from about 20 to about 30 weight percent oxygen, wherein the combustion oxidation catalyst is high temperature stable.

11. A manganese alumina combustion oxidation catalyst as recited in claim 10 wherein the manganese oxide catalyst consists essentially of from about 40 to about 60 weight percent manganese, from about 8 to about 12 weight percent lanthanum, from about 12 to about 16 weight percent copper and from about 23 to about 29 weight percent oxygen.

12. A manganese alumina combustion oxidation catalyst as recited in claims 10 or 11 wherein the manganese alumina catalyst has from about 20 to about 25 weight percent manganese oxide catalyst, the alumina spheres having a diameter of from about 0.08 mm to about 13 mm and a surface area of from about 50 to about 300 $m^2/g$.

* * * * *